(12) United States Patent
Baudino et al.

(10) Patent No.: US 7,885,394 B2
(45) Date of Patent: Feb. 8, 2011

(54) METHOD AND SYSTEM FOR CALL REVERSE

(75) Inventors: Daniel A. Baudino, Lake Worth, FL (US); Deepak Ahya, Plantation, FL (US); John M. Burgan, North Palm Beach, FL (US); Jorge L. Perdomo, Boca Raton, FL (US); Michael T. Vincent, Lake Worth, FL (US); Manish Mahajan, Sunrise, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1135 days.

(21) Appl. No.: 11/554,804

(22) Filed: Oct. 31, 2006

(65) Prior Publication Data
US 2008/0101567 A1  May 1, 2008

(51) Int. Cl.
*H04M 15/00* (2006.01)
(52) U.S. Cl. .................................. 379/114.02; 455/406
(58) Field of Classification Search ............ 379/114.02, 379/114.21, 114.01, 114.1; 455/407, 406, 455/408
See application file for complete search history.

(56) References Cited

U.S. PATENT DOCUMENTS

| | | | | |
|---|---|---|---|---|
| 5,027,387 A * | 6/1991 | Moll | | 379/115.02 |
| 5,553,124 A * | 9/1996 | Brinskele | | 379/114.02 |
| 5,799,071 A * | 8/1998 | Azar et al. | | 379/114.02 |
| 6,009,155 A * | 12/1999 | Adachi | | 379/114.21 |
| 6,381,315 B1 * | 4/2002 | Nhaissi | | 379/111 |
| 6,885,856 B2 * | 4/2005 | Nurcahya | | 455/405 |
| 6,885,997 B1 * | 4/2005 | Roberts | | 705/26 |
| 2003/0072302 A1 * | 4/2003 | Yakura | | 370/356 |
| 2003/0083968 A1 * | 5/2003 | Marsh et al. | | 705/34 |
| 2004/0137875 A1 | 7/2004 | Ueno | | |
| 2005/0021351 A1 | 1/2005 | Koskinen et al. | | |
| 2005/0036596 A1 * | 2/2005 | Merchant | | 379/114.01 |
| 2005/0213721 A1 | 9/2005 | Hakala et al. | | |
| 2006/0140200 A1 | 6/2006 | Black et al. | | |
| 2008/0261603 A1 * | 10/2008 | Sever et al. | | 455/445 |

OTHER PUBLICATIONS

Telcan, Inc., "About Us, The Company, 2003", 3 pages. http://www.telcan.net/about_us.asp?VLG=4253193, website last visited on Oct. 31, 2006.

* cited by examiner

*Primary Examiner*—Olisa Anwah
(74) *Attorney, Agent, or Firm*—Guntin Meles & Gust, PLC.; Pablo Meles (57) ABSTRACT

A method (10) and system (200, 400, or 500) of call reverse can include initiating (12) a call by an originating party (204) to a terminating party (208), comparing (14) rate plans, and automatically reversing (26) the call if a rate plan for the terminating party is currently more economical than a rate plan for the originating party. The method can compare (22) rate plans at a server (206) having rate plan information for the parties. Alternatively, the method can send (16) rate plan information for the originating to the terminating party and compare rate plans at the terminating party. The method can pre-store (20) rate plan information for the originating party at a memory at the terminating party. The method can also use (24) Caller ID to detect a call from the originating party and compare pre-stored rate plan information for the originating party stored at the terminating party.

18 Claims, 4 Drawing Sheets

|  | Mobile Originated Calls (MOC) | Mobile Incoming Calls (MIC) |
| --- | --- | --- |
| Different time zones | CA: 6:30PM | FL: 9:30PM (Free Nights) |
| Different Plans | MOC More expensive than MIC |  |
|  | Pre-Paid Minutes | Basic Plan |
|  | Limited Minutes | Flat Rate |
|  | CPP (Calling Party Pays) | MOC and MIC same rate |
| Different Providers | Free Incoming calls | Paid Incoming and outgoing |
| Different Protocols | WLAN/Skype |  |

FIG. 6 600

METHOD AND SYSTEM FOR CALL REVERSE

FIELD

This invention relates generally to communication systems, and more particularly to a method and system for reversing calls based on rate plan comparisons.

BACKGROUND

Currently, there is no way for two or more users on a call to automatically negotiate or arbitrate with respect to call plans or to automatically compare call plans to optimize the cost of Air Time Minutes used as between the users. For many years, many callers would call collect to a predetermined called party where the parties would allow the call to ring a predetermined number of times before the originating party would hang up. This would indicate to the called party that a predetermined calling party called them and they would in turn make a direct dialed call back to the predetermined calling party. In 1999 Uniden made a cordless phone that accessed a central database and seamlessly dialed long-distance calls using a least expensive long-distance provider (10-10-123 type services), but this system did not negotiate with the called party. Another known system offered by such companies as Telcan 're-originated' calls to their own telecom switch where the user dialed the Telcan number, waited for one ring and then hung up. The computer would recognize the account and 'callback' the customer any place in the world. The customer answered the phone and then placed a call anywhere in the world through a United States network at low USA rates.

SUMMARY

Embodiments in accordance with the present invention can provide a reverse calling system that is seamless and automatic in a manner that compares calling rate plans before making a reverse call.

In a first embodiment of the present invention, a method of call reverse includes the steps of initiating a call by an originating party to a terminating party, comparing rate plans between the originating party and the terminating party (as either calling parties or called parties), and automatically and transparently reversing the call if a rate plan for the terminating party is currently more economical than a rate plan for the originating party. The method can further include the steps of connecting the call from the originating party to the terminating party, recognizing by the originating party an incoming call or callback from the terminating party, and processing a seamless crossover to the incoming call or callback and terminating the call from the originating party to the terminating party.

The method can further factor in time zones for the originating party and the terminating party and a current time in the step of comparing rate plans. The method can further include the step of comparing rate plans at a server having rate plan information for the originating party and the terminating party. Alternatively, the method can include the step of sending rate plan information for the originating party to the terminating party and comparing rate plans at the terminating party. The method can also include pre-storing rate plan information for the originating party at a memory (location) at the terminating party. The method can also use Caller ID to detect a call from the originating party and comparing pre-stored rate plan information for the originating party stored at the terminating party. The method can also determine a distance between the terminating party and an alternate phone line and automatically forwarding the phone call to an alternate phone line if the alternate phone line is within a predetermined distance of the terminating party and if the alternate phone line has a rate plan more economical than the rate plan for the terminating party. Note, the rate plan of the originating party can be stored in a phonebook of the terminating party. In one embodiment, the method can compare the rate plan of the originating party or the terminating party with an alternative plan such as an alternative voice-over-IP (VOIP) plan, and automatically route the call over an alternative network or a VOIP server if the alternative plan is more economical than the rate plans for the originating party or the terminating party and if the originating party or terminating party are set up to accept calls via the alternative network. In another embodiment, the terminating party can automatically initiate a three-way call and the originating party can drop an original call with the terminating party where the terminating party automatically becomes an originator of a new call back to the originating party.

In a second embodiment of the present invention, a system for call reverse can include a originating device such as a mobile originating device having a first rate plan, a terminating device such as a mobile terminating device having a second rate plan, and a processor operatively coupled to the originating device or the terminating device. The processor can be programmed to compare rate plans between the first rate plan and the second rate plan and seamlessly and automatically reverse a call originated by the originating device to the terminating device such that the terminating device becomes an new originating caller upon determining that the second rate plan is more economical than the first rate plan. The processor can further be programmed to connect the call from the originating party to the terminating party, recognize (by the originating party) an incoming call or callback from the terminating party, and process a seamless crossover to the incoming call or callback and terminate the call from the originating party to the terminating party.

The processor can be further programmed to factor-in time zones for the originating party and the terminating party and a current time in the step of comparing rate plans. The processor can also compare rate plans at a server having rate plan information for the originating party and the terminating party. The processor can further be programmed to send rate plan information for the originating party to the terminating party and compare rate plans stored in an electronic phonebook at the terminating party. The processor can also be programmed to pre-store rate plan information for the originating party at a memory at the terminating party. The system can also include a caller ID decoder where the processor is further programmed to use Caller ID to detect a call from the originating party and comparing pre-stored rate plan information for the originating party stored at the terminating party. The processor can also be programmed to determine a distance between the terminating party and an alternate phone line and automatically forward the phone call to the alternate phone line if the alternate phone line is within a predetermined distance of the terminating party and if the alternate phone line has a rate plan more economical than the rate plan for the terminating party. In another embodiment, the processor can be programmed to compare the rate plan of the originating party or the terminating party with an alternative plan such as a voice-over-IP (VOIP) plan, and automatically route the call over an alternative network or VOIP server if the alternative plan is more economical than the rate plans for the originating party or the terminating party and if the originating party or terminating party are set up to accept calls via the alternative network. In yet another embodiment, the processor of the terminating party can automatically initiate a three-way call and the originating party can drop an original call with the terminating party where the terminating party automatically becomes an originator of a new call back to the originating party.

In a third embodiment of the present invention, wireless communication equipment having a system of call reverse can include a transceiver and a processor operatively coupled to the transceiver. The processor can be programmed to send or receive rate plan information, compare rate plans between a first rate plan and a second rate plan, and seamlessly and automatically reverse a call originated by a mobile originating device to a mobile terminating device such that the mobile terminating device becomes an new originating caller upon determining that the second rate plan is more economical than the first rate plan. Note, a portable wireless communication unit in communication with the wireless communication equipment has the first rate plan if serving as a mobile originating device and the portable wireless communication unit has the second rate plan if serving as a mobile terminating device.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways that can enable phone users and particularly cellular phone users to have their devices seamlessly and automatically compare calling rate plans before making a reverse call. Although there are some references that discuss cost sharing or reverse charges and that look at factors such as wireless roaming tariffs, prepaid or postpaid account rates, and remaining minute balances, none compares rate plans and automatically or seamlessly reverses calls when such comparison shows a more economic transaction.

Figure 1:
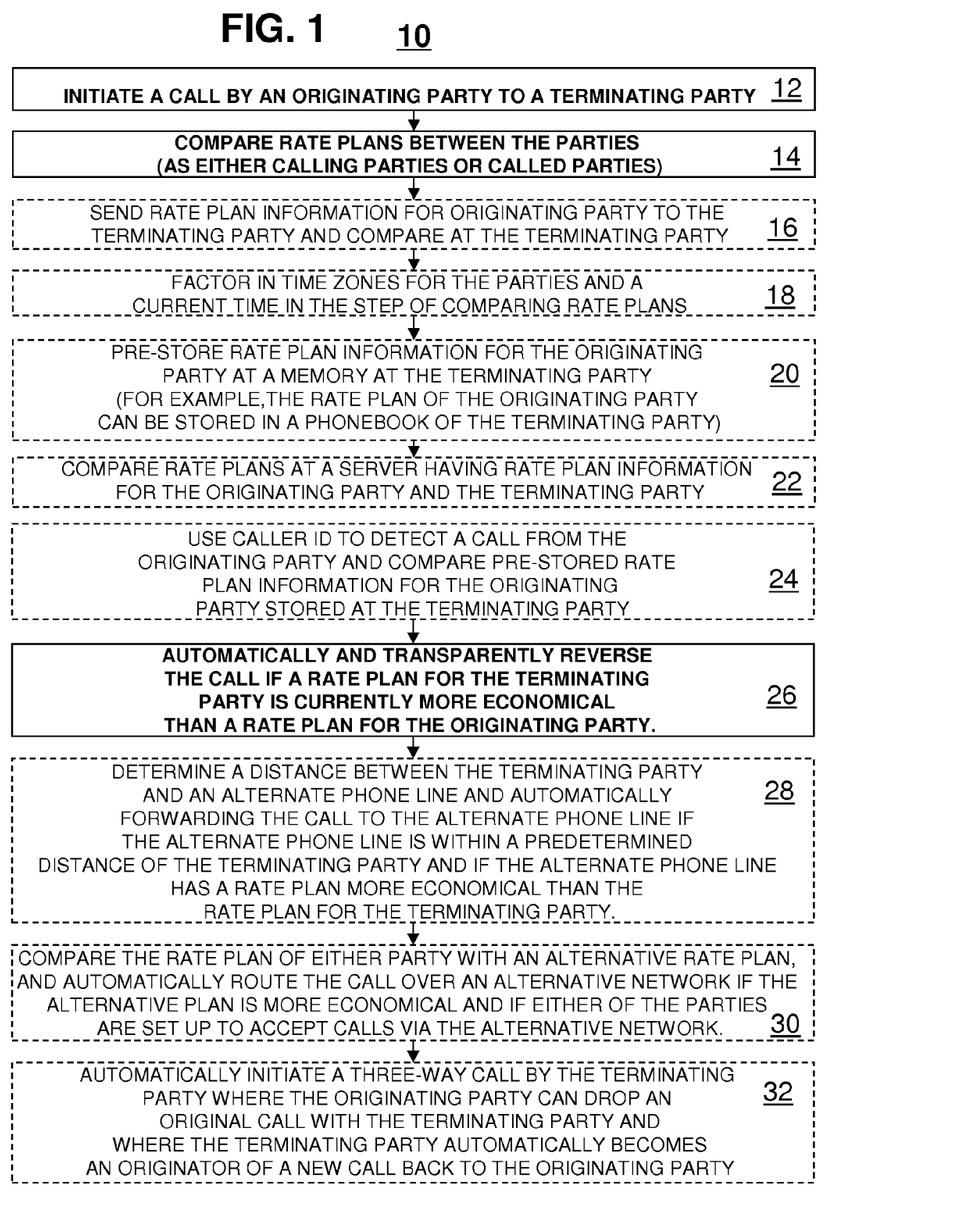
FIG. 1 is a flow chart of a method of call reversing in accordance with an embodiment of the present invention.

Referring to FIG. 1, a flow chart illustrating a method 10 of call reverse can include the step 12 of initiating a call by an originating party to a terminating party, comparing rate plans between the originating party and the terminating party (as either calling parties or called parties) at step 14, and automatically and transparently reversing the call if a rate plan for the terminating party is currently more economical than a rate plan for the originating party at step 26. The method 10 can factor-in at step 18 time zones for the originating party and the terminating party and a current time in the step of comparing rate plans. Other factors can include different rate plans, different providers or different protocols. The method 10 can further include the step 22 of comparing rate plans at a server having rate plan information for the originating party and the terminating party. Alternatively, the method 10 can include the step 16 of sending rate plan information for the originating party to the terminating party and comparing rate plans at the terminating party. The method 10 can also include pre-storing rate plan information for the originating party at a memory at the terminating party at step 20. The method can also use Caller ID at step 24 to detect a call from the originating party and comparing pre-stored rate plan information for the originating party stored at the terminating party. The method 10 at step 28 can alternatively determine a distance between the terminating party and an alternate phone line and automatically forwarding the phone call to the alternate phone line if the alternate phone line is within a predetermined distance of the terminating party and if the alternate phone line has a rate plan more economical than the rate plan for the terminating party. Note, the rate plan of the originating party can be stored in a phonebook of the terminating party. In one embodiment as shown in step 30, the method 10 can compare the rate plan of the originating party or the terminating party with an alternative plan such as an alternative voice-over-IP (VOIP) plan, and automatically route the call over an alternative network or a VOIP server if the VOIP plan is more economical than the rate plans for the originating party or the terminating party and if the originating party or terminating party are set up to accept calls via the VOIP server. Note, the alternative plans or networks can include being routed through a 10-10-xxx plan, or a calling card plan that uses a toll-free number or any other alternative plan that can be programmed into a phone to do a call reverse that might be associated with a call plan that is more economical than might be existing among the originating and terminating parties. Also, a similar scheme can be implemented in a PBX as similarly implemented in a cellular phone or cellular phonebook. Thus, the cellular phone is just an example embodiment and any intelligent phone system can support the features claimed herein.

In another embodiment as shown in step 32, the terminating party can automatically initiate a three-way call and the originating party can drop an original call with the terminating party where the terminating party automatically becomes an originator of a new call back to the originating party.

As noted above, different phone plans have different rates, restrictions and rules. Some plans might be restricted in terms of peak and non-peak hours or in pre-paid minutes, or they might grant free minutes for certain times (free night sand weekends), or some users might have a flat rate or unlimited incoming calls (Calling Party Pays in other countries). All these factors and others can be considered when deciding to make a reverse call. Thus, a "rate plan" can include any number of different plans available among different network providers.

Figure 2:
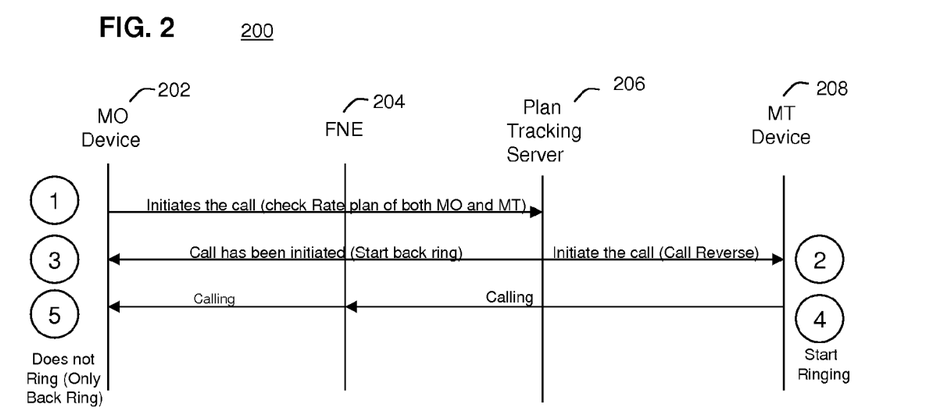
FIG. 2 is an illustration of a system and timing diagram for a reverse call scheme in accordance with an embodiment of the present invention.

In a first embodiment as illustrated in a system 200 of FIG. 2, when the user desires to make a phone call using a "cheaper party pays system" or a more economical plan, a special application can be invoked (e.g., a Java Application or applet or a modified phone book supporting this feature) as a Mobile Originator (MO) user initiates a call at a mobile originator 202 or MO or calling party to a Mobile Terminator (MT) 208 or called party. If the MT's plan is "cheaper", then the call originator will be inverted or a reverse call will occur.

Operationally, at a first step, the user can initiate a call regularly (highlighting the phone number on the application and pressing "send" key). The application initiates the call by contacting a "Plan tracking server" 206 using any transport via fixed network equipment 204. At a second step, the tracking server 206 verifies the plan previously registered by both users. The server 206 can then notify the MT 208 to initiate the call, more specifically, initiates a reverse call. If the user at the MT 208 accepts, then the call is initiated. The user (at the MT 208 or the MO 202) can also have a list of trustees (family and friends) pre-configured on the same application on the phone so that the call will be initiated transparently. Also the call can always be configured as automatic, with an alternate ring to differentiate the call, so the user can pick up the phone and cancel the call initiated. At a third step, the call is initiated by the MT 208 (and the MT becomes a Mobile Originator instead). The application residing on the MO device 202 can start playing a ring back. At a fourth step, the MT 208 initiates the call (after accepting or automatically, depending on the configuration) and starts ringing in the case the call was automatically accepted to inform the user that there is an outgoing call. An alternate ring can be configured by the user to differentiate the type of call (owner). At a fifth step, the MO user (202) hears a ring back, not a regular ring, until the other user at the MO 202 picks up the phone and answers the reverse call.

In accordance with an embodiment, the system can include a plan tracking server such as server 206. A user can register on this system (e.g., by paying a small fee or otherwise) to be able to use the reverse call service. Both users should be registered on this server to be able to perform a reverse call. If the party that the MO 202 is trying to reach is an unregistered user or phone on the "Plan tracking server", then the server 206 can send a message back to the originator (202) only (not the MT) to confirm whether the user still wants to make the paying call. The Plan tracking server 206 can compare the plan of both registered users and can change an order of the call owner based on their respective plans. This can also be applied for different time zones where in one time zone the plan changed from regular peak hour to a free nights and weekends plan. If the originator of a call has a cheaper rate, then the server informs only the originator to place the call normally. The service can also include options where the terminator "always" accepts calls from predetermined numbers regardless of the rates associated with the originator.

Figure 3:
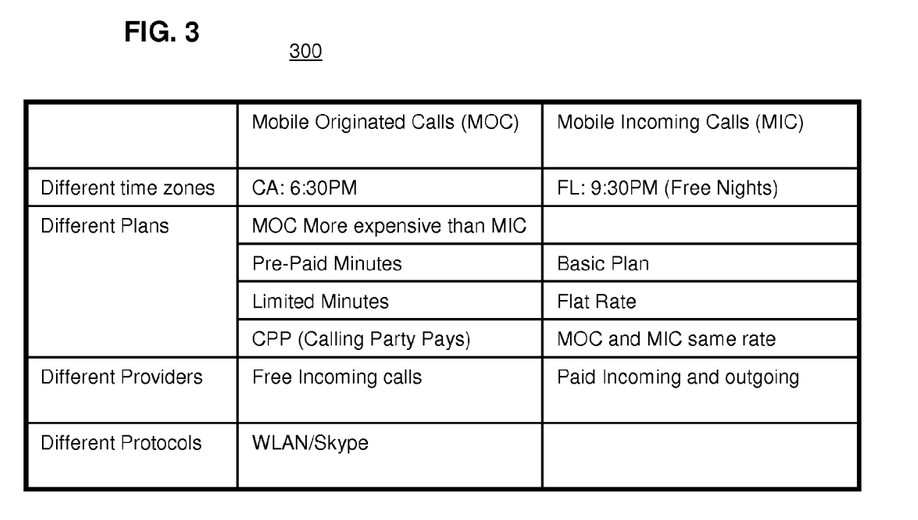
FIG. 3 is a table of use cases illustrating when it is more economical to perform a reverse call in accordance with an embodiment of the present invention.

Referring to a table 300 in FIG. 3, several use cases are shown illustrating when it is better to reverse a call among two mobile phones. The factors that can determine the justification for reversing a call can include different time zones, different plans, different providers, as well as different communication protocols. In the case of times zones, a caller in California at 6:30 pm might originate a call to someone in Florida who can have a "free nights and weekends" calling plan. The caller in Florida, being three time zones away, can make a free reverse call since the local time in Florida is 9:30 pm and well within the "night" time period. With respect to different calling plans, one plan might have a more expensive per minute calling plan or one plan might include a limited or more expensive pre-paid minute plan as opposed to a basic plan. In yet another calling plan comparison scenario, an originator might have a limited number of free minutes while a called party might have a flat rate plan entitling such user to an unlimited or a significant number of calls at a particular rate. As mentioned above, several European countries use a Calling Party Pays (CPP) system. If a called party has to pay the same rate for incoming and outgoing calls, the called party might as well make the call to the party having the CPP plan. In the case where different providers have different features such as free incoming calls for an originating party on one plan and paid calls on both incoming and outgoing for a called party, the calls should be reversed to take advantage of the free incoming call plan owned by the originating party. Finally, wireless local area network calls or Internet phone calls are becoming widely popular and are currently inexpensive in comparison to conventional and cellular phone plans. Again, a comparison of protocol type can justify an automated reverse call as contemplated herein. Furthermore, what makes a rate plan more economical than another can primarily be based on cost among parties that are presumed to be shared or not shared, but can also look at other factors as well a noted above.

Figure 4:
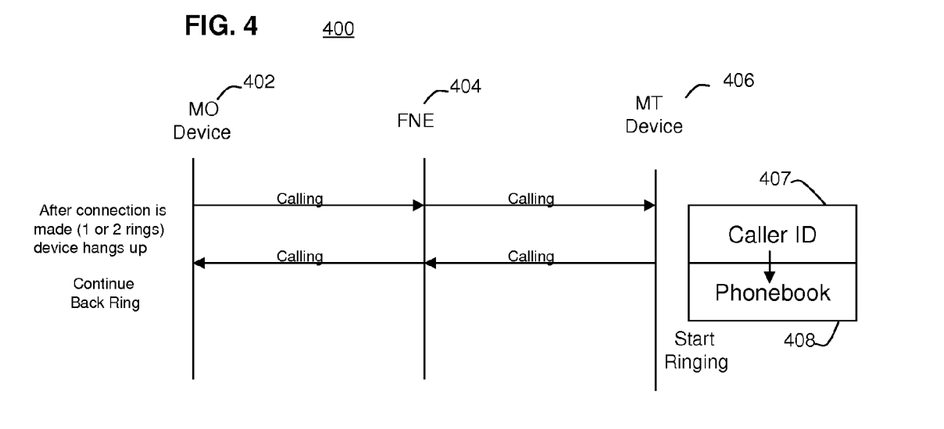
FIG. 4 illustrates a system and timing diagram where caller ID and pre-stored information is used to perform a reverse call in accordance with an embodiment of the present invention.

Referring to FIG. 4, a system 400 using caller ID reverse call initiation can include a mobile originating device (MO) device 402, a mobile terminating (MT) device 406 and infrastructure or fixed network equipment (FNE) 404. The MT 406 (receiver) can be pre-programmed with a modified phone book that includes people or associated phones numbers that causes the device 406 to automatically reverse a call received from such associated phone numbers or pre-configured numbers. When a device 402 assigned with a pre-configured number is initiating the call, the system can be configured such that the call can always reverse (fixed reverse). When an incoming call is received from a pre configured number in a fixed reverse type of system, the receiving device 406 can automatically hang up, and can initiate the call back to the originator or MO 402. This can all be done transparent to the user. The originator device 402 continuously plays the ringback tone (even though the call was dropped) and does not ring when the call is received from the MT 406 in a reverse call. The receiving call at the MT 406 does not ring when it detects the originator (402) being on the reverse call list, and initiates the reverse call. Once the connection is established, then the MT device 406 starts ringing to alert the user that there was an incoming call even though the user's device 406 seamlessly initiated the reverse call. The process is seamless and transparent since the call initiator and receiver are not necessarily aware of all the process behind the scene and since this is based on receiving a predetermined phone number that had been pre-stored at the MT device 406. Note also that the originator device transparently processes a seamless crossover to an incoming call or a callback and terminates the (original) call from the originating party (402) to the terminating party (406). In this instance, the MT device 406 can use a caller ID decoder 407 to determine the originating caller phone number. The caller ID number can be compared with phone numbers stored in a phone book or a reverse call list. It can be assumed that both users on either end would want their systems to operate in this manner.

In another embodiment, the rate plan can be stored locally on each device (402 and 406) and then at the moment that the call is initiated, the devices exchange calling plan using any known transport. The phone can have the information about the caller locally pre-stored (pre-configured by the user) and both devices can interchange the rate information and the time (for calls initiated in different time zones, different rates—e.g., operating with different countries or plans). In one instance, the phones can be manually configured such that when one user (User B) calls another family member (User A), the calls will be reversed. This can be useful in the instance where a family member on a restricted income such as an elderly parent or child calls another family member without such restricted income, the calls will be reversed automatically. In this manner, the user does not burden the child or elderly parent with additional expenditures.

In another embodiment, the user can automatically route the call to a different line (for example a land line). When the user gets home in the middle of a cellular phone call, by selecting a re-route option, the device can automatically start a 3-way call, calling a predetermined second number such as a landline. Then the user can pick up the land line (when ringing) and automatically the call gets transferred to the other phone and the cell phone terminates the existing call automatically. This can save Air-Time minutes on the calling plan. The same methodology can be applied to private calls using an alert method. For example, when calling overseas or coast to coast, whoever initiates the call, pays for the call (depends on the plan). If a user A alerts another user B, and user B responds initiating the private call, then user B pays. This can be automatically done.

Figure 5:
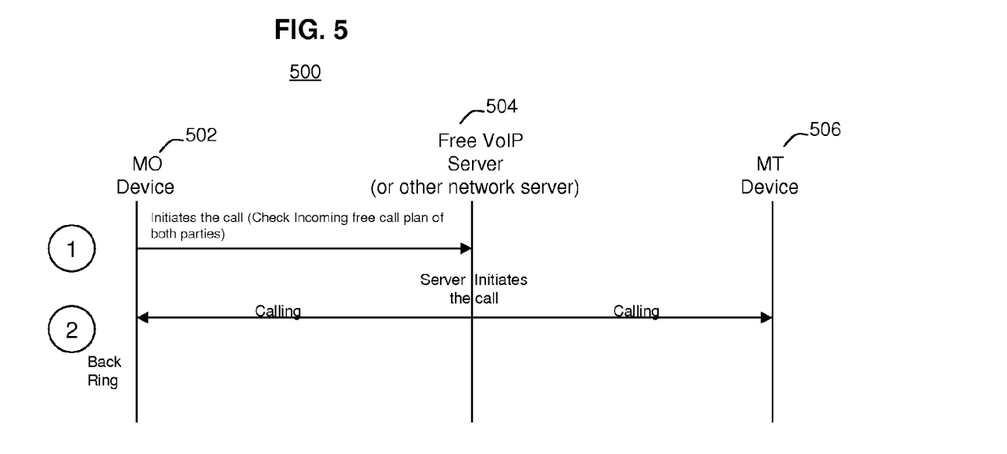
FIG. 5 illustrates another system and timing diagram where a VOIP server is used to compare rates and perform a reverse call in accordance with an embodiment of the present invention.

In another embodiment as illustrated by a system 500 of FIG. 5, a user might be registered to a free Voice over IP (VoIP) service, indicating that he or she has free incoming calls. At a first step, every time that a call is initiated (made through this server using any transport), a Free VoIP server 504 checks if the other party is also in a incoming free calls plan. If that is the case, then the server 504 calls back to both parties and initiates a free call for both parties (502 and 506) This way the call is free for both parties. If the other user does not have a free incoming call plan, the call is initiated this way and the originator is the only one performing this free call.

Note, a call initiated either through a server or directly to the other device can use any transport such as SMS message or any type of IP protocol.

The calls initiated and routed using the techniques described herein can have a longer initiation time, but will typically be cheaper or free with respect to the parties calling. By utilizing the reverse methodologies herein users can now optimize their call plans collectively and have additional choices on how they spend funds for air time minutes. In one instance, use of free VoIP services can create totally free initiated and incoming cell phone calls.

Figure 6:
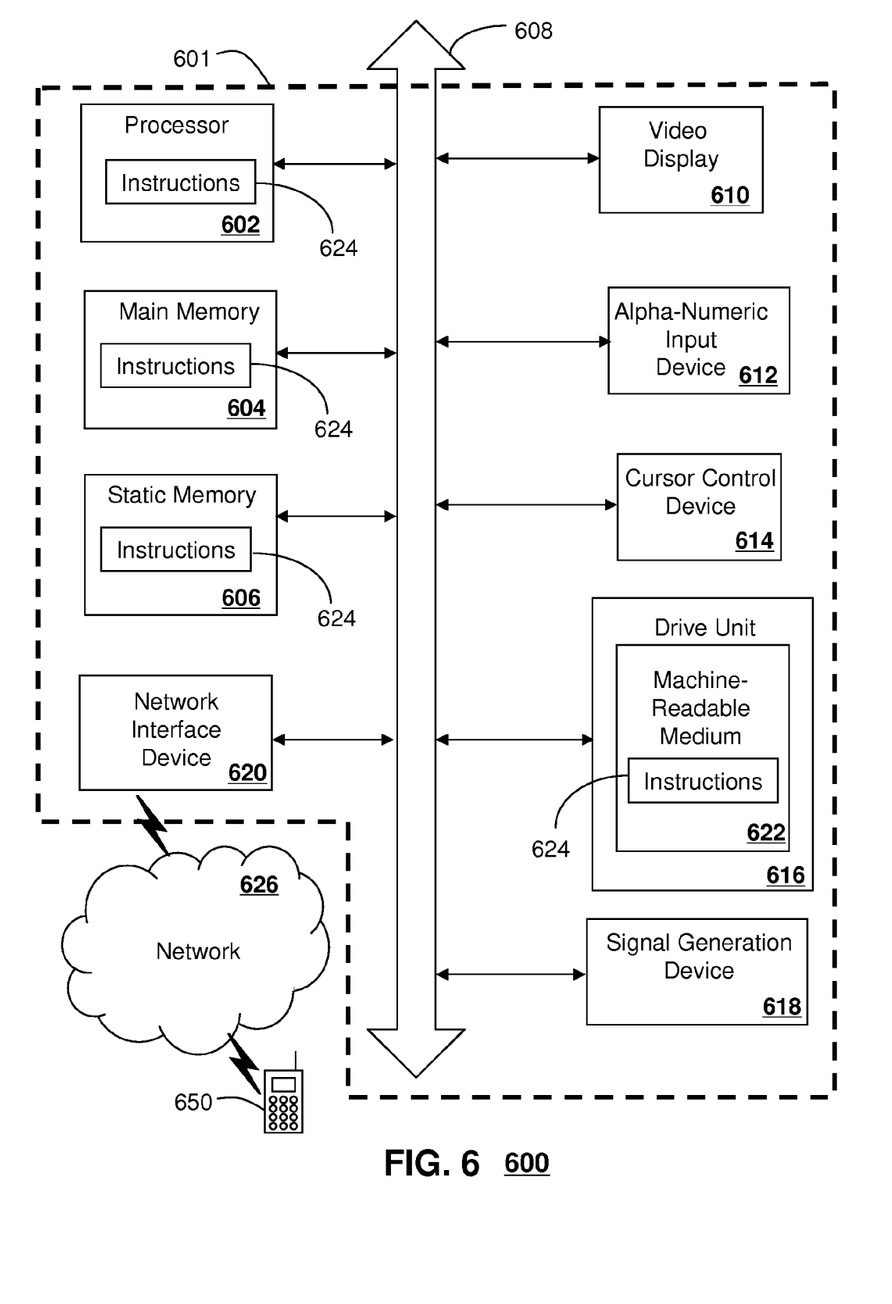
FIG. 6 is a block diagram of a system including one or more wireless communication devices in accordance with an embodiment of the present invention.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 601 and a sending device 650 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 can include a controller or processor 602 (e.g., a central processing unit (CPU), a graphics processing unit (GPU, or both), a main memory 604 and a static memory 606, which communicate with each other via a bus 608. The computer system 600 may further include a presentation device such as a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control that can also serve as a presentation device) and a network interface device 620. Of course, in the embodiments disclosed, many of these items are optional.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing and can also be constructed to implement the methods described herein. Further note, implementations can also include neural network implementations, and ad hoc or mesh network implementations between communication devices.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of call reverse, comprising the steps of:
   initiating a call by an originating party to a terminating party;
   sending rate plan information for the originating party to the terminating party;
   comparing rate plans between the originating party and the terminating party at the terminating party, as either calling parties or called parties; and
   automatically and transparently reversing the call if a rate plan for the terminating party is currently more economical than a rate plan for the originating party.

2. The method of claim 1, wherein the method further comprises the step of factoring time zones for the originating party and the terminating party and a current time in the step of comparing rate plans.

3. The method of claim 1, wherein the method further comprises the step of comparing rate plans at a server having rate plan information for the originating party and the terminating party.

4. The method of claim 1, wherein the method further comprises the step of pre-storing rate plan information for the originating party at a memory at the terminating party.

5. The method of claim 1, wherein the method further comprises the step of using Caller ID to detect a call from the originating party and comparing pre-stored rate plan information for the originating party stored at the terminating party.

6. The method of claim 1, wherein the method further comprises the step of determining a distance between the terminating party and an alternate phone line and automatically forwarding the phone call to an alternate phone line if the alternate phone line is within a predetermined distance of the terminating party and if the alternate phone line has a rate plan more economical than the rate plan for the terminating party.

7. The method of claim 1, wherein the method further comprises the step of storing the rate plan of the originating party in a phonebook of the terminating party.

8. The method of claim 1, wherein the method further comprises the step of comparing the rate plan of the originating party or the terminating party with an alternative plan, and automatically routing the call over an alternative network corresponding to the alternative plan if the alternative plan is more economical than the rate plans for the originating party or the terminating party and if the originating party or terminating party are set up to accept calls via the alternative network, wherein the alternative plan can be selected among voice over IP (VoIP) plan, a 10-10-xxx plan, or a calling card plan that uses a toll-free number prefix.

9. The method of claim 1, wherein the terminating party automatically initiates a three-way call and the originating party drops an original call with the terminating party and the terminating party automatically becomes an originator of a new call back to the originating party.

10. The method of claim 1, wherein the method further comprises the steps of:
    connecting the call from the originating party to the terminating party;
    recognizing by the originating party an incoming call or callback from the terminating party; and
    processing a seamless crossover to the incoming call or callback and terminating the call from the originating party to the terminating party.

11. A system for call reverse, comprising:
    a originating device having a first rate plan;
    a terminating device having a second rate plan; and
    a processor operatively coupled to the mobile originating device or the terminating device, wherein the processor is programmed to:
        connect the call from the originating party to the terminating party;

recognize by the originating party an incoming call or callback from the terminating party;

compare rate plans between the first rate plan and the second rate plan; and upon determining that the second rate plan is more economical than the first rate plan, seamlessly and automatically reverse a call originated by the originating device to the terminating device such that the terminating device becomes an new originating caller by processing a seamless crossover to the incoming call or callback and terminating the call from the originating party to the terminating party.

12. The system of claim 11, wherein the processor is further programmed to compare rate plans at a server having rate plan information for the originating party and the terminating party.

13. The system of claim 11, wherein the processor is further programmed to send rate plan information for the originating party to the terminating party and compare rate plans stored in an electronic phonebook at the terminating party wherein the originating device is a mobile originating device and the terminating device is a mobile terminating device.

14. The system of claim 11, wherein the system further comprises a caller ID decoder and the processor is further programmed to use Caller ID to detect a call from the originating party and comparing pre-stored rate plan information for the originating party stored at the terminating party.

15. The system of claim 11, wherein the processor is further programmed to determine a distance between the terminating party and an alternate phone line and automatically forward the phone call to an alternate phone line if the alternate phone line is within a predetermined distance of the terminating party and if the alternate phone line has a rate plan more economical than the rate plan for the terminating party.

16. The system of claim 11, wherein the processor is further programmed to compare the rate plan of the originating party or the terminating party with an alternative plan, and automatically route the call over an alternative network corresponding to the alternative plan if the alternative plan is more economical than the rate plans for the originating party or the terminating party and if the originating party or terminating party are set up to accept calls via the alternative network, wherein the alternative plan can be selected among voice over IP (VOIP) plan, a 10-10-xxx plan, or a calling card plan that uses a toll-free number prefix.

17. The system of claim 11, wherein a processor of the terminating party automatically initiates a three-way call and the originating party drops an original call with the terminating party and the terminating party automatically becomes an originator of a new call back to the originating party.

18. Wireless communication equipment having a system of call reverse, comprising:

a transceiver; and a processor operatively coupled to the transceiver, wherein the processor is programmed to:

send or receive rate plan information;

use Caller ID to detect a call from a mobile originating device and compare pre-stored rate plan information for a mobile originating device stored at a mobile terminating device;

compare rate plans between a first rate plan and a second rate plan, wherein a portable wireless communication unit has the first rate plan if serving as the mobile originating device and the portable wireless communication unit has the second rate plan if serving the a mobile terminating device; and upon determining that the second rate plan is more economical than the first rate plan, enabling a seamless and automatic reverse call originated by the mobile originating device to the mobile terminating device such that the mobile terminating device becomes an new originating caller.

* * * * *